March 28, 1944. I. JEPSON ET AL 2,345,265
FILTER ASSEMBLY FOR COFFEE MAKERS
Original Filed Dec. 6, 1940  2 Sheets-Sheet 2
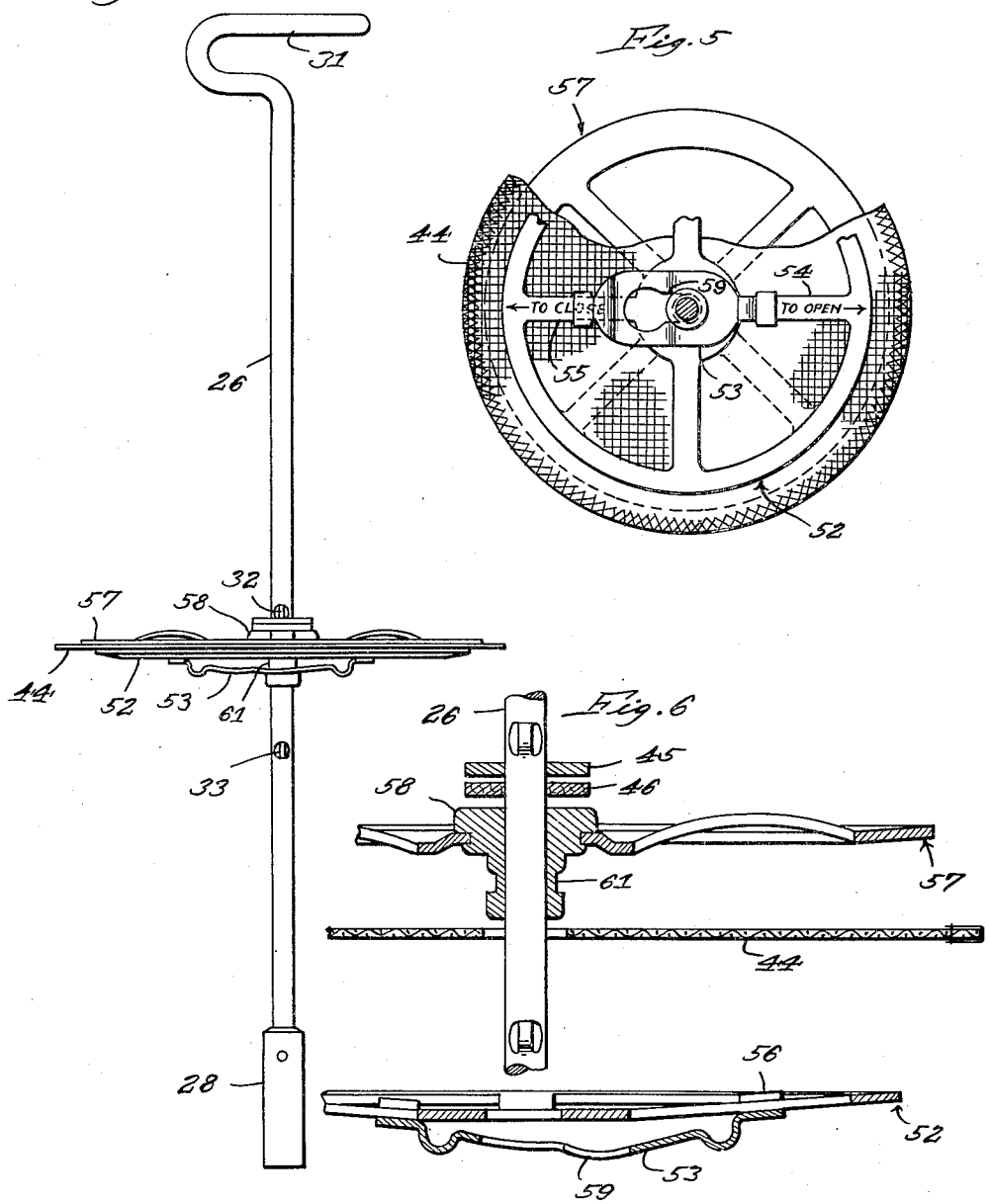

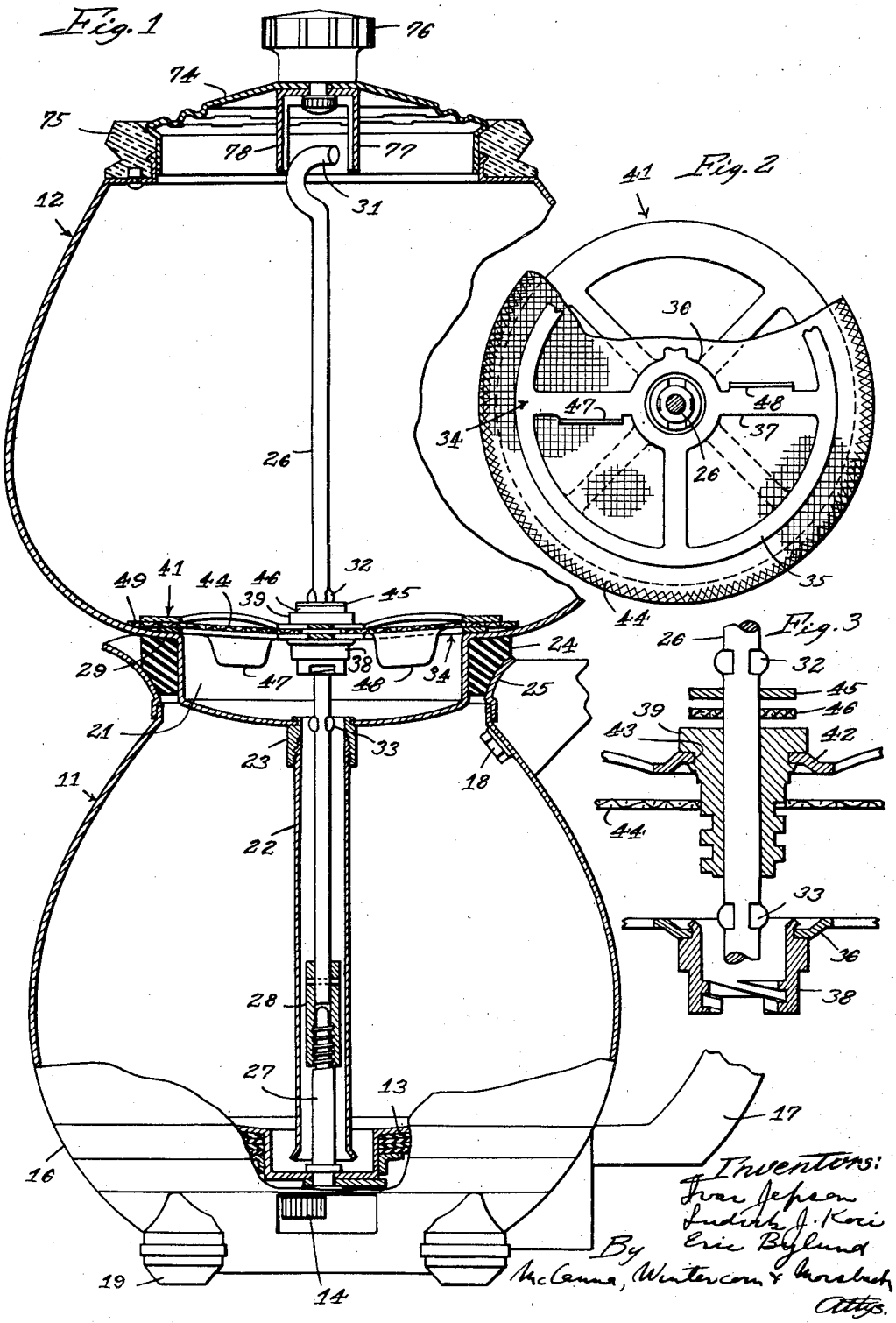
March 28, 1944.     I. JEPSON ET AL     2,345,265
FILTER ASSEMBLY FOR COFFEE MAKERS
Original Filed Dec. 6, 1940     2 Sheets-Sheet 1

Patented Mar. 28, 1944

2,345,265

UNITED STATES PATENT OFFICE 2,345,265

FILTER ASSEMBLY FOR COFFEE MAKERS

Ivar Jepson, Chicago, and Eric Bylund, Genoa, Ill., assignors to Chicago Flexible Shaft Company, Chicago, Ill., a corporation of Illinois Original application December 6, 1940, Serial No. 368,758. Divided and this application September 3, 1942, Serial No. 457,242

6 Claims. (Cl. 210—185)

This is a division of application Serial No. 368,758, filed December 6, 1940.

This invention relates to improvements in the kind of coffee maker commonly known as the vacuum type in which the water is heated in one container and transferred to another for contact with the ground coffee whereupon it is returned to the first container. This application has especial reference to the filter assembly for such coffee makers.

One object of our invention is to provide an improved and simplified filter means that will insure the provision of clear coffee.

Another object of our invention is to provide a filter assembly having a filter cloth that may be conveniently and easily removed and replaced for cleaning purposes.

Another object of our invention is to provide a coffee maker having improved filter means of relatively large filter area with the view to decreasing the filtering time. Our improved construction avoids the disadvantages of prior filter assemblies which utilize a basket type filter frame and a filter cloth held on the frame by means of a draw string, and provides a filter element of sheet material adapted to be clamped between upper and lower frame members in a manner to permit of quick and easy replacement.

Another object of our invention is the provision of a relatively large diameter filter assembly in coaction with a relatively large diameter sealing ring between the lower and upper vessels of the coffee maker with the view to obtaining improved clamping and sealing effects between the filter assembly and the upper vessel and between the upper and lower vessels.

Other objects and attendant advantages will be appreciated by those skilled in this art as the invention becomes better understood by reference to the following description when considered in connection with the accompanying drawings, in which—

Figure 1 is a vertical section through a coffee maker embodying one construction of the invention;

Fig. 2 is a bottom elevation of the filter assembly unit shown in Fig. 1, on an enlarged scale;

Fig. 3 is a longitudinal section of the filter assembly, on a further enlarged scale, showing the removable parts in a spaced relation;

Fig. 4 is a side elevation of an alternative filter assembly construction showing the fastening rod connected therewith;

Fig. 5 is a bottom elevation of the filter assembly shown in Fig. 4, on an enlarged scale; and Fig. 6 is a longitudinal section through the filter assembly of Fig. 4, on a further enlarged scale, showing the removable parts in a spaced relation.

Referring to Fig. 1, the coffee maker shown is one known as the vacuum type which operates by the displacement of water from the coffee pot into another container containing the coffee grind. After mixing with the grind, the coffee is caused to return to the pot through the lowering of the temperature therein. Aside from the filter assembly, the coffee maker shown in Fig. 1 is substantially the same as that disclosed in Jepson applications filed October 27, 1938, and September 11, 1939, Serial Nos. 237,247 and 294,306, respectively. Briefly, this type of coffee maker consists of a pot 11 and a coffee container or bowl 12 disposed above the pot 11. As more fully explained in the above-mentioned applications, heat is supplied to the pot 11 by an electrical heating unit comprising a heating element 13 and a thermostatic mechanism which controls the heat during a coffee making stage and a coffee warming stage. A switch 14 is provided to initiate the coffee making stage of operation, that is, to initiate the automatic cycle of operations disclosed in said application Serial No. 237,247. The present invention, however, is not limited to the inventions of said applications.

In the embodiment here shown for purpose of illustration the pot 11 is supported in a base 16 of an insulating material such as a molded plastic. The lower end of a handle 17 is attached to the base 16 while the other end is secured to the upper portion of the pot 11 by a screw 18. Legs 19 are provided on the base 16 to elevate the pot from a table surface to prevent the scorching or burning thereof. The bowl 12 is of a generally symmetrical shape and has a bottom well 21 which terminates in a displacement tube 22 that is connected to the bowl by a threaded boss 23 which permits the removal of the tube for cleaning. A gasket 24 is mounted on the well portion 21 of the bowl 12 to seat against an outwardly flared rim 25 of the pot 11 to provide a means for securing the bowl to the pot to form a steam tight joint therebetween.

In the present embodiment of the invention, the bowl 12 is securely clamped to the pot 11 by a rod 26 which extends downwardly into the tube 22 to fasten onto an upstanding stud 27 that is secured to the bottom of the pot 11. An internally threaded sleeve 28 secured to the lower end of the rod 26 is provided to engage the threads on the stud 27. As will be more fully described, the marginal portion of a filter assembly unit is pressed against an annular surface 29 of the bowl 12 as the rod 26 is screwed onto the stud 27. A hooked upper end portion 31 of the rod 26 provides convenient means for turning it so that it may be fastened or removed from the stud 27. Spaced abutments 32 and 33 are provided at the central portion of the rod 26, the upper abutment 32 being located to exert downward pressure upon the filter assembly as the rod 26 is tightened to the stud 27.

Referring to the construction in Figs. 1, 2, and 3, the filter assembly consists of a lower frame 34 having a circular marginal portion 35 and a center portion 36 connected thereto by spokes 37. The center portion 36 is secured to a nut member 38 adapted for attachment to a bolt member 39 that is slidably positioned on the rod 26 between the abutments 32 and 33. An upper frame 41 of substantially the same shape as the lower frame 34 has a center portion 42 which is fastened within an annular groove 43 of the bolt 39. Both the lower and upper frames 34 and 41 are of one-piece stamped metal construction which provide sufficient flexibility to avoid their setting in a distorted shape through continued use. Thus, when the marginal edge of the filter assembly unit is pressed against the annular surface 29 of the bowl 12, it will adapt itself to the annular bowl surface 29 to provide a tightly fitting seal therearound. A filter cloth 44 of disc shape containing a center hole for the insertion of the bolt member 39 is held between the two frame members 34 and 41 when the nut member 38 is screwed on the bolt member 39. It will be observed, Fig. 3, that annular faces 34' and 41' are provided on the lower and upper frame members 34 and 41, respectively, near the center thereof, to clamp the interposed filter cloth and thereby provide an effective seal against the passage of coffee grounds through the center opening of the filter cloth. Washers 45 and 46 provide thrust bearing surfaces for the turning of the abutment 32 to impart downward thrust against the filter assembly when the rod 26 is screwed on to the stud 27 when connecting the parts in the operative relation. Downwardly turned lugs 47 and 48 integral with the lower frame 34 provide an easy gripping means for unscrewing the lower frame 34 from the upper frame 41 when removing the filter cloth after the filter assembly unit has been removed from the coffee maker. The marginal portion 35 of the lower frame member serves to support the filter cloth in substantially a flat plane and with its marginal portion in position to properly seat on the surface 29 when the filter assembly is inserted into the coffee maker.

In operation, the coffee grind will be placed in the bowl 12 and the water in the bowl 11. As the water is heated it will be forced in the tube 22 through the filter cloth 44 and into the bowl 12 until it is substantially all displaced from the pot 11 into the bowl 12. Upon release of the pressure in the pot 11 by the lowering of its temperature, the coffee mixture in the bowl 12 will run downwardly through the filter assembly through the tube 22 to the pot 11, its grounds being filtered out by filter cloth 44. It should be clear that the filter cloth including its extreme marginal edge 49 establishes a seal across the well 21 to prevent any coffee grounds from returning with the coffee.

When all the liquid has returned to the pot 11, the bowl 12 is removed from the pot 11 by unscrewing the rod 26 from the stud 27 and lifting the bowl 12 containing the filter assembly from the pot 11. It will be observed that this unscrewing of the rod 26 takes place without disturbing the sealing position of the filter cloth, due to the fact that the rod turns freely in the sleeve 69 while being disconnected from the stud 27. The rod 26 and the filter assembly supporting the coffee grounds may then be removed from the bowl 12 by lifting the rod 26 through grasping its hooked portion 31. During this procedure, the abutment 33 will engage the bottom portion of the bolt member 39 to support the filter assembly on the rod. To remove the filter cloth 44 for cleaning, the lower frame member 34 is unscrewed from the bolt member 39 through the use of lugs 47 and 48, permitting both the lower frame 34 and the filter cloth 44 to be disassembled from the rod 26. Assembly of the filter cloth to the rod 26 is accomplished in the reverse manner, whereupon the rod and filter assembly may be installed in the bowl 12 and pot 11 as previously described.

In Figs. 4, 5, and 6, another embodiment of the invention is shown. In this construction there is provided a lower frame member 52 that contains a slidable clip 53 which moves on opposed spokes 54 and 55. Lugs 56 on the end portions of the clip are overturned about the spokes 54 and 55 to slidably mount the clip 53 thereon. The upper frame 57 is fixedly secured to a central sleeve 58 which is slidably mounted on the rod 26. The two frames 52 and 57 are assembled together with the filter cloth 44 therebetween and the frames are releasably locked or clamped together and to the interposed filter cloth by means of the clip 53 whose narrowed slot portion 59 is moved to engage an annular groove 61 of the sleeve 58 in the manner illustrated in Fig. 5. In this embodiment the slotted portion of the clip is bowed or arched downwardly between its lugs 56 and this bowed portion is shaped to provide cam surfaces at opposite sides of the slot having a low point 50 (with reference to the mounting on the spokes 54—55) at the wide end of the slot and a high point 50' near the narrow end of the slot, as shown in Figs. 5 and 6. Thus, when the lower frame 52 is positioned to be connected to the sleeve 58 the wide end of the slot 59 will be in alignment with the sleeve as shown in Fig. 6 so that when the parts are brought together the lower end of the sleeve will enter the wide end of the slot with the low point 50 of the clip located in the plane of the annular groove 61. In this position the clip may be slid to the left, viewing Fig. 6, thus bringing the high portion 50' of the cam into coaction with the adjacent shoulders of the groove 61 and tensioning the clip until the high portion of the cam passes the center of the sleeve as shown in Fig. 5, and yieldingly locks or clamps the parts in this "closed" position or relation. It is clear that the filter cloth 44 may be removed for cleaning by moving the clip 53 to the "open" position and drawing it from the rod 26.

As is more fully described in the Jepson applications hereinbefore mentioned, a cap 74 that seats within an annular ring 75 of an insulating material provides a closure for the bowl 12 and also for the pot 11 when the bowl 12 is removed therefrom. The cap 74 contains a knurled knob 76 and opposed flanges 77 and 78, the latter of which engage the hooked end portion 31 of the rod 26 so that it may be turned onto or from the stud 27 through the turning of the cap 74.

From the foregoing it will be apparent that the disc type filter cloth provided by our invention is utilized in such novel manner as to permit of quick and easy removal and replacement, thus facilitating and aiding in the desired practice of keeping the filter clean so that the coffee will be clear and wholesome when made under normal operations. This construction also promotes economy because filter discs of this kind are of low cost. Another advantage of our invention is in using a disc shaped filter element in combination with a filter assembly constituting a unit adapted to be inserted into and removed from the coffee maker for placing the filter cloth in its operative position and for removing it therefrom, together with means permitting quick and easy removal of the filter cloth from the unit. Another advantage of our invention is in the provision of a filter of the disc type in combination with a supporting structure in the nature of a removable filter assembly so constructed and arranged for coaction with a coffee maker as to provide a relatively large filter area and lowering of the filtering time. Another advantage is in providing a construction which will avoid the tendency of coffee grounds or sediment to collect in bottom corners of the upper bowl and to pass through the tube into the coffee liquor in the lower pot. This construction, therefore, tends to insure the making of clear coffee. Another advantage of our invention is in the provision of a relatively large diameter sealing ring between the lower pot and the upper bowl in coaction with the relatively large diameter filter disc and its supporting structure. In this connection it will be observed that the resilient sealing ring seats against adjoining angular walls at the exterior of the well portion at the bottom of the bowl, one of which walls constitutes a bottom wall of the bowl, and that the filter assembly seats on the upper side of this bottom wall opposite from the sealing ring and is clamped downwardly against this bottom wall in such manner that the clamping force serves to establish an effective seal between the filter assembly and the bowl and between the bowl and the pot through the intermediary of the sealing ring. Furthermore, our invention provides narrow spokes or arms connecting the hub portion of the upper frame member with the marginal clamping portion, this construction providing sufficient flexibility to permit accommodation of the marginal clamping portion to any irregularity in the shape of the bottom wall of the bowl or in variations incident to slight displacement of the bowl with respect to the pot when seating the former on the latter.

The term "filter cloth" as used in the claims is intended to mean any filter element or medium adapted to coact with the parts recited to perform the functions of this invention.

Various modifications may be made in the device embodying our invention without departing from the spirit and scope thereof, and we desire, therefore, that only such limitations shall be placed thereon as are imposed by the prior art and the appended claims.

We claim:

1. A filter assembly comprising a rod having axially spaced abutments, a sleeve freely slidable axially and rotatably on the rod between said abutments, an upper frame fixed to said sleeve, a lower frame, a filter disc interposed between the frames and being imperforate except for a center opening to receive the sleeve, each frame having an annular surface near the center for clamping the interposed filter disc to provide an effective seal around its center opening, each frame having a marginal portion for engaging the interposed filter disc and a perforate portion entered from its marginal portion for passage of liquid through the filter, means operative between the sleeve and the lower frame to detachably connect the lower frame in coaction with the upper frame to clamp the interposed filter disc between said annular surfaces, the lower frame and the filter disc being removable over the lower end of the rod, and a thrust bearing between the upper abutment and the adjacent end of the sleeve.

2. A filter assembly comprising a rod having axially spaced abutments, a sleeve freely slidable axially and rotatably on the rod between said abutments, an upper frame fixed to said sleeve, a lower frame, a filter disc interposed between the frames and being imperforate except for a center opening to receive the sleeve, each frame having a clamping surface near its center adapted for clamping the filter disc to provide an effective seal around its center opening, each frame having a marginal portion for engaging the filter disc and a perforate portion between its said clamping surface and its said marginal portion for passage of liquid through the filter, and means operative between the sleeve and the lower frame to detachably connect the lower frame in coaction with the upper frame to clamp the interposed filter disc between said surfaces.

3. A filter assembly comprising a rod having axially spaced abutments, a sleeve freely slidable axially and rotatably on the rod between said abutments, a filter element, an upper frame and a lower frame each having a clamping portion between which the filter element is adapted to be held and each having a perforate portion for passage of liquid through the filter, the upper frame being fixed to the sleeve, and means operative between the sleeve and the lower frame to detachably connect the lower frame in coaction with the upper frame and to clamp said clamping portions to the interposed filter element.

4. A filter assembly as set forth in claim 3, in which the clamping means comprises an external thread on the lower end of the sleeve and the lower frame is provided with an internal thread adapted to engage the thread on the sleeve.

5. A filter assembly as set forth in claim 3, in which the clamping means comprises a clip member slidable on the lower frame and coacting means on the clip member and on the sleeve adapted to be brought into and out of engagement by sliding movements of the clip member to hold the upper and lower frames in cooperative relation and to disengage them.

6. A filter assembly as set forth in claim 3, in which the clamping means includes an annular groove in the lower portion of the sleeve and the clip member has an opening adapted to receive the grooved end of the sleeve in one position of said clip member and a restricted opening adapted to engage in the grooved portion in another position of the clip member to hold the upper and lower frames in operative relation.

IVAR JEPSON.
ERIC BYLUND.